Sept. 29, 1970 H. T. FULLER 3,531,787

AUTOMATIC MAGNETIC DRUM CLOCK TRACK RECORDER

Filed June 20, 1967 4 Sheets-Sheet 1

INVENTOR.
HORACE T. FULLER
BY
ATTORNEYS

Sept. 29, 1970 H. T. FULLER 3,531,787

AUTOMATIC MAGNETIC DRUM CLOCK TRACK RECORDER

Filed June 20, 1967 4 Sheets-Sheet 2

INVENTOR.
HORACE T. FULLER

BY

ATTORNEYS

Sept. 29, 1970 H. T. FULLER 3,531,787

AUTOMATIC MAGNETIC DRUM CLOCK TRACK RECORDER

Filed June 20, 1967 4 Sheets-Sheet 3

INVENTOR.
HORACE T. FULLER

BY

ATTORNEYS

INVENTOR.
HORACE T. FULLER
BY
[signatures]
ATTORNEYS

United States Patent Office 3,531,787
Patented Sept. 29, 1970

3,531,787

AUTOMATIC MAGNETIC DRUM CLOCK TRACK RECORDER

Horace T. Fuller, Los Angeles, Calif., assignor, by mesne assignments, to the United States of America as represented by the Secretary of the Navy Filed June 20, 1967, Ser. No. 648,190
Int. Cl. G11b 5/00, 5/76, 23/36
U.S. Cl. 340—174.1 14 Claims

ABSTRACT OF THE DISCLOSURE

A recording apparatus for recording selected numbers of precisely spaced full and half clock pulses on a clock track of a revolving magnetic drum type storage device. The apparatus includes circuitry for writing an index pulse on a spare track of the drum, a voltage controlled multivibrator for producing a square wave of adjustable frequency from which is derived a series of full and half clock pulses and circuitry responsive to improper time spacing of the clock pulses relative to the index pulse for making changes in a control voltage applied to change the frequnecy of the multivibrator. The frequency changes are specifically related to both the direction and the degree of the improper time displacement of the clock pulses from the index pulse.

Background of invention

Generally, magnetic drum type storage devices include a track having prerecorded clock pulses thereon. A general class of the many systems which have been devised to record these clock pulses includes those systems having a device whose output frequency is adjusted until an exact number of approximately equally spaced pulses have been recorded along the clock track of the rotating drum. Known systems for adjusting the output frequency of such devices generally have a null determining mode of operation and are subject to inaccuracy, lack of resolution and jitter, which, in turn, cause the output frequency of the device to drift and/or jitter about the value which is correct relative to the rotational speed of the drum upon which the clock track is being recorded. Further, the signal causing an incremental frequency change in known systems represents an average error derived over a number of revolutions of the drum which error may not necessarily be representative of the instantaneous situation for a particular revolution. Undesirably long periods of time are conventionally required for the known systems to affect an exact closure so that the first of the recorded clock pulses in a series is equally spaced from both the second and the last pulses of the series adjacent thereto.

Brief summary of invention

It is a general purpose of this invention to provide an automatic clock track recording apparatus which avoids the deficiencies of the previously known devices and can affect a substantially jitter free closure in a much shorter time than was heretofore considered possible. Briefly, this is accomplished by providing circuitry to digitally ascertain the degree and direction of the imperfection in clock pulse spacing relative to a prerecorded index pulse and to cause corresponding controlled changes in the output frequency of a voltage controlled multivibrator so that the frequency is a multiple of the angular velocity of the drum. The multivibrator output activates the generation of the clock pulses to be recorded. More specifically, apparatus is provided which includes digital logic circuitry responsive to the time difference between the actual or projected occurrences of a prerecorded index pulse and the last of a selected number of clock pulses to be recorded during one drum revolution for providing a duration controlled, increment or decrement signal which actuates a corresponding change in a voltage which appears across a capacitor bank and is applied through a high input impedance ampliger to control the multivibrator output frequency.

Description of preferred embodiment

Figure 1:
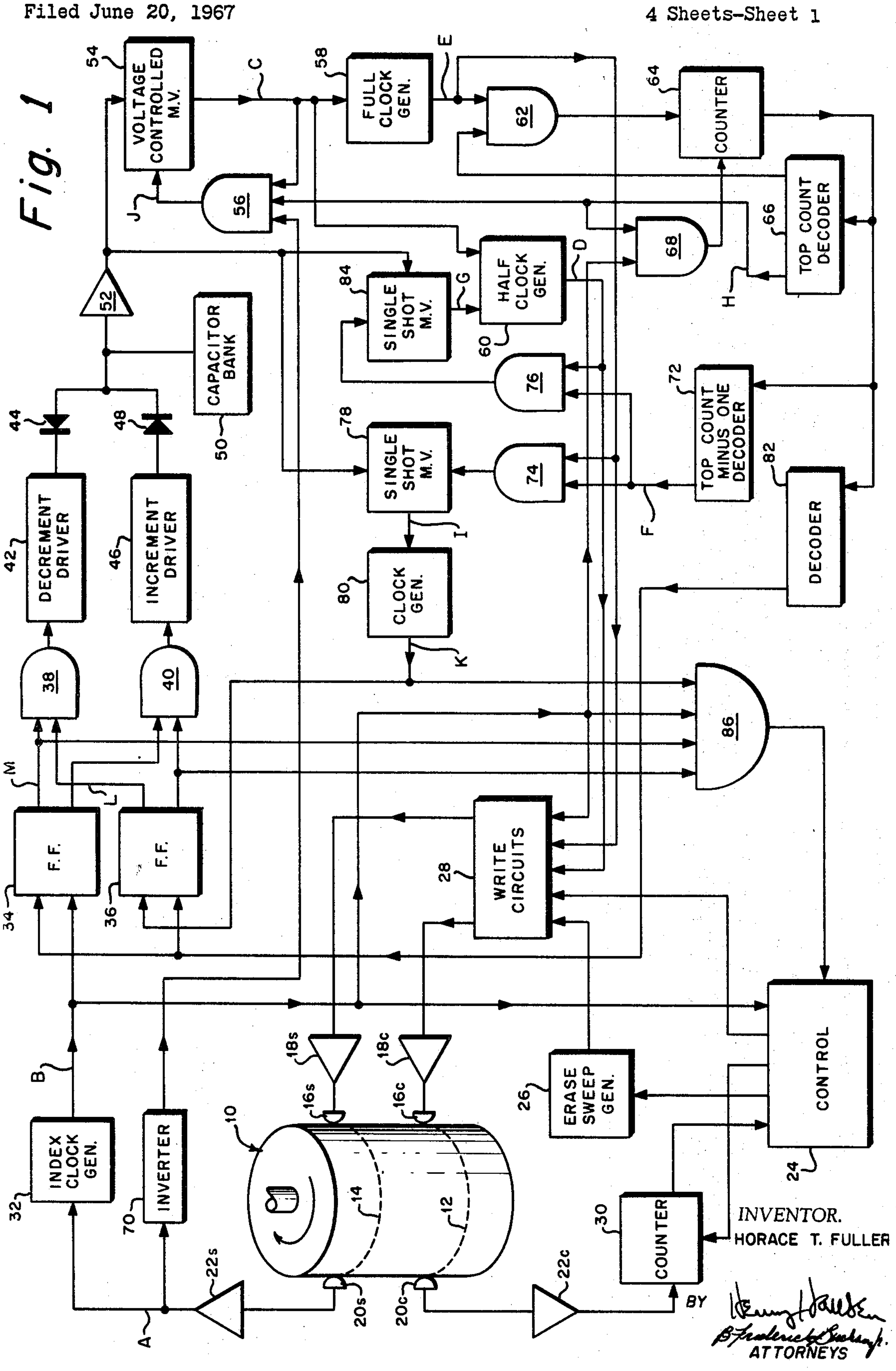
FIG. 1 is a block and partial schematic diagram of a clock track recorder according to the invention.

Generally, the preferred embodiment of a clock track recording apparatus shown in FIG. 1 is used to record full clock pulses and half clock pulses in alternating time sequence on a magnetic memory drum 10 which is being rotated at a selected normal operating speed. The drum 10 is of the type having a plurality of parallel magnetic tracks upon which digital information may be recorded. One of the plural tracks 12 is selected to have clock pulses recorded thereupon. A spare track 14 is also selected to have recorded thereupon an index pulse which serves, among other things, to indicate that a full revolution of the drum 10 has been completed. By conventional methods, writing heads 16*c* and 16*s* each having respective associated write amplifiers 18*c* and 18*s* are precisely positioned adjacent respective ones of the tracks 12 and 14. Reading heads 20*c* and 20*s* each having respective amplifiers 22*c* and 22*s* are also precisely positioned adjacent respective ones of the tracks 12 and 14.

A clock track recording control unit 24 is provided which effectively causes a sweep generator 26 to generate an erasing signal which is directed to the write head 16*s* through one of a number of write circuits 28 which are also controlled by the control unit 24. After the spare track 14 has been erased, the control unit 24 actuates one of the write circuits 28 to cause an index pulse of controlled duration to be written by the head 16*s* on the track 14. When the control unit 24 receives an indication that closure has been achieved so that a selected number of precisely positioned clock pulses has been recorded upon the clock track 12 by the write head 16*c*, as hereinafter explained, the control unit 24 will cause a counter 30 which is connected to receive the output of the read head 20*c* to be activated to count during one drum revolution the number of clock pulses recorded on the track 12 in order to check to see that the clock track recording system has functioned properly and end the clock recording process.

Figure 2:
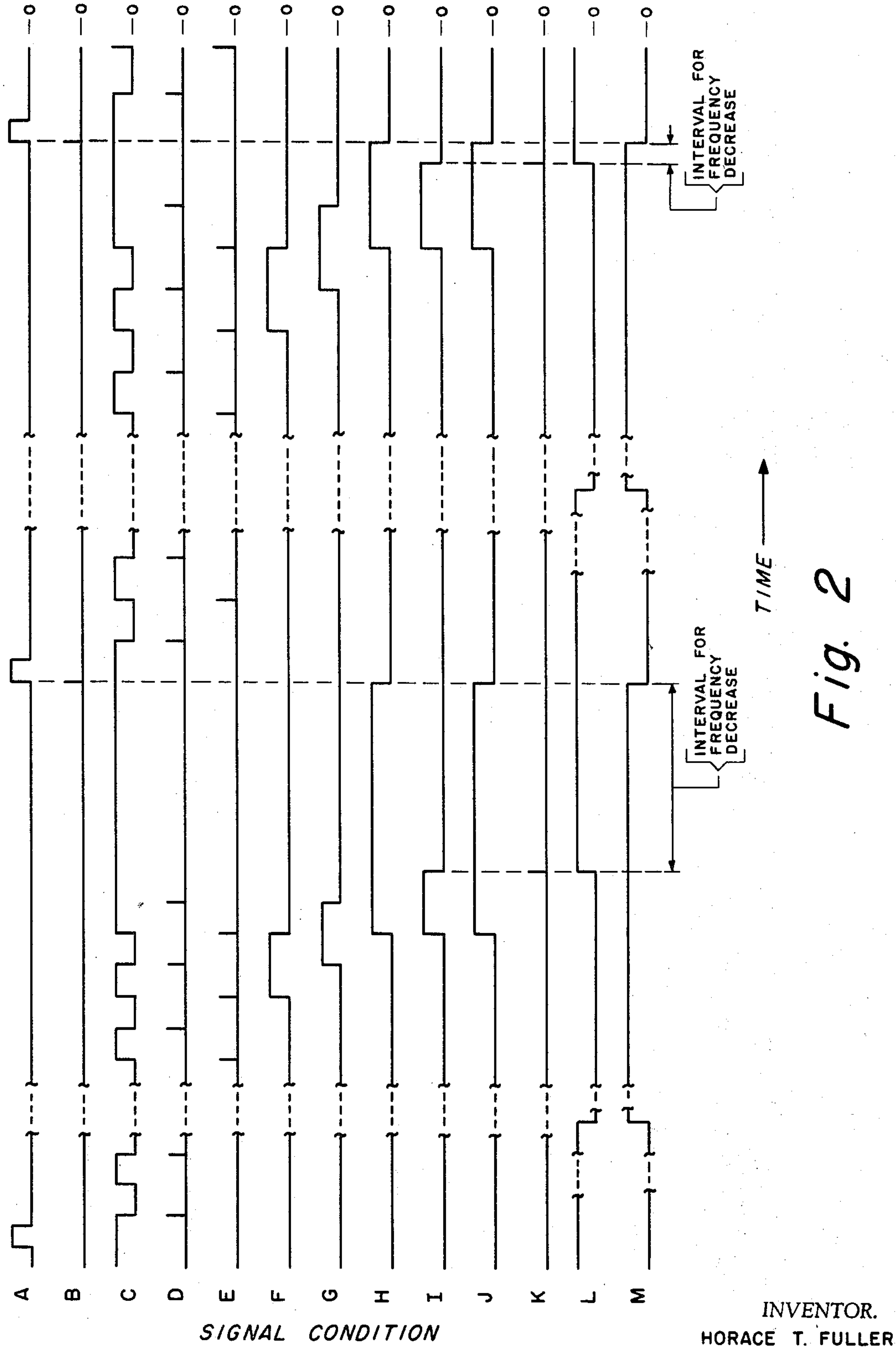
FIG. 2 is a time diagram of various wave forms present in the apparatus of FIG. 1 when the multivibrator has an output frequency which is too high.
Figure 3:
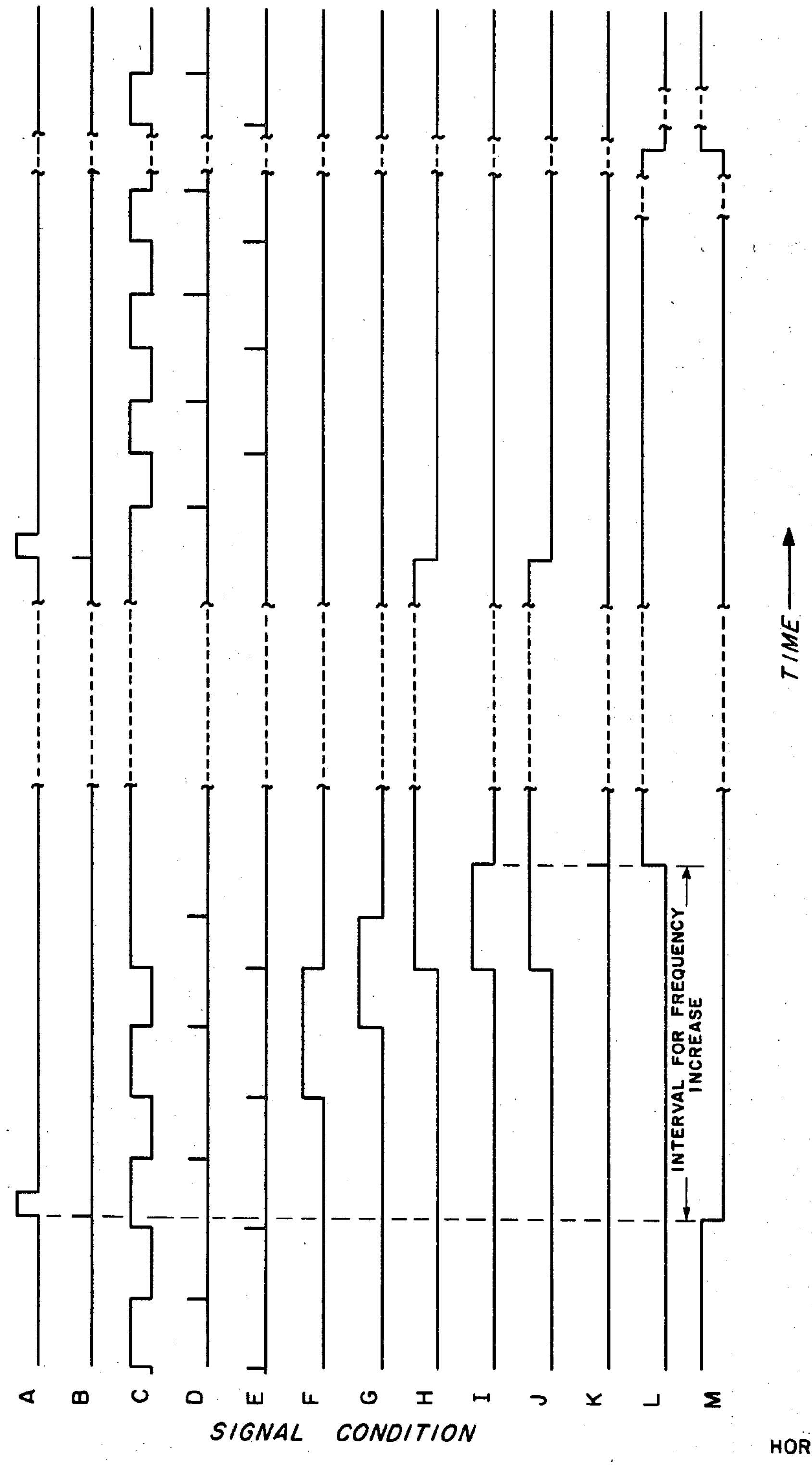
FIG. 3 is a time diagram of the various waveforms when the output frequency is too low.
Figure 4:
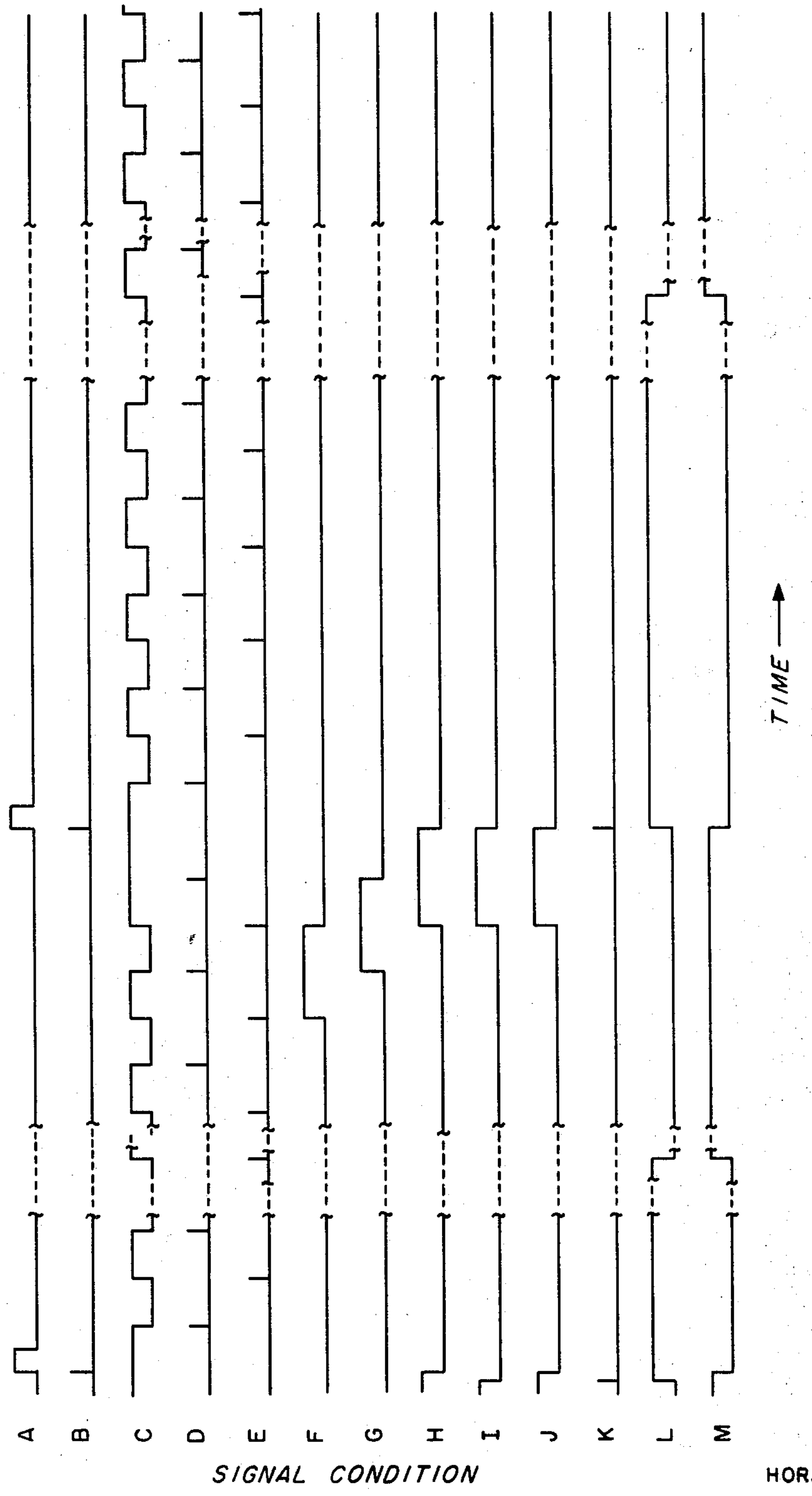
FIG. 4 is a time diagram of the various waveforms when the output frequency is properly adjusted and closure is achieved.

The recorded index pulse is read by the head 20*s* as it passes thereby during each complete revolution of the drum 10, is amplified to produce an amplified index pulse, waveform A in FIGS. 2, 3 and 4, and is fed to a clock generator 32 which produces an index clock pulse of short duration, waveform B in FIGS. 2, 3 and 4, in response to the leading edge of the amplified index pulse. A duration of 150 nanoseconds for the index clock pulse and the other clock pulses hereinafter discussed has been found satisfactory in a system used to record full clock pulses having selected frequencies of 200 kc. and 300 kc. The index clock pulse produced by the generator 32 is fed to a reset input terminal of the first of a pair of high speed flip-flops 34 and 36 which have a short runout time, such as 30 nanoseconds.

The flip-flops 34 and 36 each produce "1" signals, waveforms L and M in FIGS. 2, 3 and 4, at respective set output terminals upon receiving a "1" signal at respective set input terminals. The set output terminals of the flip-flops 34 and 36 are connected to the input terminals of an AND gate 38 which produces an output signal in "1" condition when the singals provided thereby by the flip-flops 34 and 36 are in a "1" condition. Similarly, the flip-flops 34 and 36 provide "1" signals at reset output terminals upon receiving a signal having a "1" condition at the respective reset input terminals. The reset output terminals thereof are connected to respective input terminals of an AND gate 40 which produces an output signal having a "1" condition when both flip-flop singals received thereby have a "1" condition.

The output signal of the AND gate 38 is fed to a decrement driver 42 which normally provides a positive voltage to the cathode of a diode 44 through an internal resistor, not shown. Similarly, the output of the AND gate 40 is fed to an increment driver 46 which normally supplies a zero voltage to the anode of a diode 48. The anode of the diode 44 and the cathode of the diode 48 are connected together and to the junction between a terminal of a grounded capacitor bank 50 having a very low allowable leakage and an input terminal of an amplifier 52, such as a bootstrap isolation amplifier, having a high input impedance. The amplifier 52, in effect, applies the voltage across the capacitor bank 50 to a voltage controlled multivibrator 54 to control the frequency of a square wave output thereof, waveform C in FIGS. 2, 3 and 4.

Changes in the voltage across the capacitor bank 50 as applied thereto through one of the diodes 44 or 48 correspondingly adjust the output frequency of the multivibrator 54. More specifically, when the decrement driver 42 receives a "1" signal, it produces a negative voltage which causes diode 44 to conduct. Thereby, the voltage across the capacitor bank 50 tends to approach the negative voltage and is decreased at a rate depending upon the time constant of the capacitor bank 50 and the internal resistor of the driver 42. At some time thereafter, when the input signal to the driver 42 changes to a "0" condition, the driver 42 again applies a positive voltage to the cathode of diode 44, reverse biasing it and turning it off. Thereby, further negative adjusting of the voltage across the capacitor bank 50 and the corresponding decreasing of the multivibrator output frequency cease.

Similarly, upon receiving an input signal from the AND gate 40 in a "1" condition, the driver 46 begins to provide positive voltage to the anode of diode 48, causing it to conduct. Thereby, the voltage across the capacitor bank 50 tends to approach the positive voltage at a rate dependent upon the time constant of the capacitor bank 50 and an internal resistor of the driver 46. At some time thereafter, when the signal from the AND gate 40 changes to a "0" condition, the driver 46 applies a zero voltage to the anode of diode 48, reverse biasing it and turning it off. Thereby, further positive adjusting of the voltage across the capacitor bank 50 and the corresponding increasing of the multivibrator output frequency cease. From the above, it appears that the incremental or decremental change in the voltage across the capacitor bank 50 is directly related to the duration of the "1" condition of the corresponding output signals from the AND gates 40 and 38.

The voltage controlled multivibrator 54 nominally provides a square wave output signal having a selected frequency equivalent to that desired for the series of full clock pulses to be recorded on the clock track 12 of the rotating drum 10. This frequency is also equivalent to that desired for the series of half clock pulses which are each spaced equally in time from preceding and succeeding full clock pulses. It is contemplated that a multivibrator could be fabricated which, at the discretion of an operator, could provide the square wave output signal having a nominal frequency of any several of full clock frequencies which may be desired to be recorded. Further, the multivibrator 54 is of the type which includes circuitry to hold the multivibrator output in a "1" condition when an AND gate 56 provides it with a signal in a "1" condition.

The square wave output of the multivibrator 54 is fed to both a full clock generator 58 and a half clock generator 60. In response to the change of the signal condition of the multivibrator output from a "0" to a "1," the full clock generator 58 provides a full clock pulse, waveform E in FIGS. 2, 3 and 4, which is used to cause the generation of a clock pulse to be recorded. Similarly, the half clock generator 60 in response to the transition of the signal condition of the multivibrator output from a "1" to a "0" provides a half clock pulse, waveform D in FIGS. 2, 3 and 4, which is used to cause the generation of a clock pulse to be recorded. Therefore, it is apparent that the half clock generator 60 will provide a clock pulse one half cycle after the multivibrator 54, in response to a change of the output signal of the AND gate 56 from a "1" to a "0," has been released to provide the square wave output signal having a frequency governed by the output signal of the amplifier 52. One half cycle after the provision of the first of a series of half clock pulses by the generator 60, a full clock pulse will be provided by the full clock generator 58. Since the output of the multivibrator 54 is a square wave, the half clock pulse will be centered in time with respect to the intervals between successive full clock pulses.

The half and full clock pulses are fed to the write circuits 28 wherein they actuate generation of the clock pulses of controlled duration which are to be recorded and are diverted to the write amplifier 18*c* as dictated by the control unit 24 in order that they may be written on the clock track 12 of the revolving drum 10. The particular characteristics and shapes of the recorded clock pulses are controlled by the write circuits 28 and the write amplifier 18*c*. For example, the full clock pulses from generator 58 can be used to trigger the generation of pulses having the desired characteristics of the half clock pulses to be recorded. The apparatus is continually recording clock pulses on the track 12 in response to the full and half clock pulses provided by the generators 58 and 60 during the clock track recording mode of operation. Generally, the durations of the recorded clock pulses are substantially longer than the very short durations of the clock pulses provided by the generators 32, 58 and 60.

The full clock pulses from the generator 58 are also fed to an AND gate 62 whose output in turn, is fed to a counter 64. A top count decoder 66 is connected to receive the output of the counter 64 and functions to provide a top count signal, waveform H in FIGS. 2, 3 and 4, which is fed to an AND gate 68. The top count signal has a "1" condition when a predetermined number of full clock pulses have been counted by the counter 64. Generally, the predetermined number of full clock pulses to be counted corresponds to that number of full clock pulses which are to be recorded on the track 12, which pulses will provide the desired clock frequency when the drum 10 is rotated at normal operating speed. Since the counter 64 is not connected to actually receive and count the index clock pulse which occurs at the same time that the first full clock pulse in the series should occur, the counter 64 is mechanized to begin counting from a count of one. The AND gate 68 is connected to receive the index clock pulse from the generator 32 and functions to provide a reset signal to the counter 64 when the index clock pulse is received and the decoder 66 is providing a top count signal in a "1" condition. The counter 64 includes circuitry responsive to the reset signal for resetting itself to a binary coded decimal count of 0 . . . 0.1. Alternatively, the counter 64 could be mechanized to be reset to a count of zero; and the decoder 66 could be mechanized to provide a "1" top count signal when the counter 64 has registered a count of one less than the number of full clock pulses which is actually desired to be recorded on the track 12 during one drum revolution.

The decoder 66 also provides a counter enable signal fed to the AND gate 62, which signal is the complement of the top count signal and has a "1" condition so long as the counter 64 has not counted the predetermined number of pulses. Thus, when the counter enable signal of the decoder 66 goes to a "0" condition, any later occurring full clocks from the generator 58 cannot be passed to the counter 64.

The AND gate 56 is connected to receive the output signal of an inverter 70 which, in turn, is connected to receive the amplified index pulse from the read amplifier 22*s*. The inverter 70 provides a signal having a "1" contion so long as the head 20*s* is not reading the recorded index pulse. The AND gate 56 is also connected to receive the output of the voltage controlled multi-vibrator 54 and the top count signal from the decoder 66. Since a full clock pulse will not have been produced by the generator 58 until the output signal of the multivibrator 54 has gone from a "0" to a "1" condition, it is apparent that the AND gate 56 will provide a "1" signal as soon as the decoder 66 provides a top count signal having a "1" condition. At this time the output of the multivibrator 54 will be held in a "1" condition. When the index pulse is read by the amplifier 22, the output of the inverter 70 goes from a "1" to a "0" condition at a time coincident with the occurrence of the index clock pulse provided by generator 32; and the output of the AND gate 56 is caused, thereby, to go to a "0" condition. In response to the foregoing change in signal condition, the output signal of the multivibrator 54 will go from a "1" to a "0" condition after a period of time equal to one half cycle of the output frequency thereof as controlled by the voltage then being provided by amplifier 52.

The output of the counter 64 is also fed to a top count minus one decoder 72 which produces an output signal, waveform F in FIGS. 2, 3 and 4, which assumes a "1" condition when the counter 64 registers the count next preceding the selected top count and, thereafter, a "0" condition when the counter 64 registers the clock pulse which causes a "1" top count signal. The output signal of the decoder 72 is fed to a pair of AND gates 74 and 76. The AND gate 74 is also connected to receive the output of the full clock generator 58 and provides an output signal having a "1" condition upon the provision of the next occurring full clock pulse, which output signal is fed to tigger a single shot multivibrator 78. The multivibrator 78 is connected to receive the output control voltage of the amplifier 52 and is adapted to provide a rectangular pulse of duration exactly equal to the duration of one cycle of the output signal which would be provided by the multivibrator 54 in response to that amplifier output control voltage. The rectangular output signal of the multivibrator 78 is fed to a clock generator 80 which produces a signal clock pulse in response to the transition of the multivibrator output from a "1" to a "0" condition. Thus, it is apparent that the clock pulse from the generator 80 occurs exactly one multivibrator cycle after the last full clock pulse provided by the full clock generator 58. The clock pulse from generator 80 is fed to the set input terminal of the flip-flop 36 which is set thereby and provides a set output signal in a "1" condition.

In order that the flip-flops 34 and 36 may be respectively set and reset prior to the occurrence of either the clock pulse from the generator 80 or the index clock pulse from the generator 32, a decoder 82 provides a pulse which is fed to the set input terminal of flip-flop 34 and the reset input terminal of flip-flop 36. The pulse is provided when the counter 64 has registered a predetermined number of pulses, which number is preferably less than the least anticipated number of full clock pulses which would be provided by the generator 52 during one revolution of the drum at various speeds within the anticipated range thereof. The predetermined number should not be so low that the output pulse from the decoder 82 will interfere with frequency adjustments when the frequency is too low. It has been found convenient to set the predetermined number in the range of ⅕ to ⅓ of the selected number for top count.

Since the first full clock pulse produced by the generator 58 does not occur until one full multivibrator cycle after the occurrence of the index clock pulse from generator 32, the write circuits 28 are connected to receive the index clock pulse from the generator 32 in order that the circuits 28 may cause the amplifier 18*c* and head 16*c* to record a clock pulse on the track 12 at the time the index pulse occurs. Additionally, it appears that the multivibrator 54 will not cause the generator 60 to provide a half clock pulse to the write circuits 28 during the interval between the last occurring full clock pulse and the thereafter occurring index clock pulse provided upon the completion of that particular revolution of the drum 10. To this end, the AND gate 76, which is connected to receive the output signal of the decoder 72, is also connected to receive the half clock pulses from the generator 60 and provides an output signal pulse fed to trigger a single shot multivibrator 84. The output signal of the AND gate 76 has a "1" condition when the last occurring half clock pulse produced by the generator 60 in response to the output of the multivibrator 54 is being received during an interval in which the decoder 72 is providing an output signal in a "1" condition. The single shot multivibrator 84 is similar to the single shot multivibrator 78 in that it is connected to receive the output control voltage of the amplifier 52 and provides in response to the trigger pulse from the AND gate 76 a rectangular pules of controlled duration equal to the duration of one cycle of the square wave output signal of the multivibrator 54. The output pulse of the multivibrator 84 is fed to the half clock generator 60 which in response to the transition of the output signal of the multivibrator 84 from a "1" to a "0" condition, provides a half clock pulse which, in turn, is fed to the write circuits 28 for activation of the recording of a clock pulse on the track 12.

The clock pulse from the generator 80, the index clock pulse from the generator 32, the set output signal from the flip-flop 34 and the reset output signal from the flip-flop 36 are all fed to an AND gate 86. When all of the signals received have a "1" condition, the AND gate 86 produces an output pulse having a "1" condition which is fed to the control unit 24. The reception of a "1" signal pulse from AND gate 86 indicates to the control unit 24 that the proper number of clock pulses has been recorded, the pulses being recorded in equally spaced positions along the track 12. It is preferred that the control 24 be mechanized so that the clock recording mode of operation is not ended until the AND gate 86 has produced pulses on two succeeding revolutions of the drum. The particular combination of signals supplied to the AND gate 86 confines the possible interval for signalling the coincidence of the index clock pulse and the clock pulse from generator 80 to the shorter of either the flip-flop runout time or the range during which at least the required minimum overlap of the clock pulses is present.

The operation of the above-described clock track recording apparatus may be better understood by referring to the waveform diagrams of FIGS. 2, 3 and 4. In FIG. 2, it has been assumed that an index pulse has been recorded on the spare track 14 of the rotating drum 10 and that the control voltage being provided by the amplifier 52 is large enough so that the frequency of the output of the multivibrator 54 is too high relative to the speed of rotation of the drum 10. When the index pulse, waveform A, has been read by the head 20*s* and sufficiently amplified by the amplifier 22*s*, the generator 32 generates the index clock pulse, waveform B. During the occurrence of the index pulse, the output signal of the inverter 70 goes from a "1" to a "0" condition thereby causing the release of the multivibrator 54 so that it produces a square wave, waveform C, which goes from a "1" condition to a "0" condition one-half cycle after the occurrence of the index clock pulse and has a frequency controlled by the voltage from the amplifier 52. When the multivibrator output goes from a "1" to a "0" condition, a half clock pulse, waveform D, is provided by the generator 60. Similarly, when the multivibrator output, waveform C, goes from a "0" to a "1" condition, the full clock generator 58 provides a full clock pulse, waveform E.

Since the frequency of the square wave is too high relative to speed of rotation of the drum 10, the output signal of the decoder 72, waveform F, will be caused to have a "1" condition prior to the occurrence of the next index clock pulse which would signal the completion of a revolution of the drum 10 when the counter 64 has registered a number of pulses which is one less than the predetermined number. Upon the occurrence of the next succeeding half clock pulse from generator 60, the single shot multivibrator 84 is triggered and produces a rectangular pulse, waveform G, of controlled duration.

Thereafter, the output signal of the multivibrator 54 goes from a "0" to a "1" condition causing the full clock generator 58 to provide the last of the predetermined number of full clock pulses to be counted by the counter 64. The occurrence of the last of the full clock pulses provided by generator 58 causes the AND gate 74 to trigger the multivibrator 78 since the AND gate 74 is at that time receiving a "1" signal from the decoder 72. This causes the multivibrator 78 to provide a rectangular pulse, waveform I, of duration controlled by the existing voltage output of the amplifier 52. Substantially at the same time as the triggering of the multivibrator 78, the counter 64 registers the last full clock pulse; the top count decoder 66 provides the top count signal, waveform H, in a "1" condition; and the output signal of the decoder 72, waveform F, goes to a "0" condition. Since the index pulse has not yet been read, the signal from the inverter 70 is in a "1" condition. The output signal from the multivibrator 54 is then in a "1" condition, having just caused the generator to provide the last of the full clock pulses in the series. Consequently, the AND gate 56 provides its output signal, waveform J, in a "1" condition to the multivibrator 54 so that the multivibrator output is held in a "1" condition.

The trailing edge of the rectangular pulse, waveform I, from the multivibrator 78 causes the clock generator 80 to emit a clock pulse, waveform K, which is fed to set the flip-flop 36 as illustrated by waveform L. The flip-flop 34 is providing a set output signal, waveform M, in a "1" condition since it had been reset by the decoder 82 at some time prior to the occurrence of the clock pulse from clock generator 80. The AND gate 38 provides an output signal in a "1" condition and causes the decrement driver 42 to decrease the voltage across the capacitor bank 50 in order to effectuate a decrease in the frequency of the multivibrator output signal, waveform C.

The next index clock pulse which occurs is fed to reset flip-flop 34 so that further decreasing of the voltage across the capacitor bank 50 ceases. The index clock pulse is also fed both to the write circuits 28 for actuating the recording of a clock pulse on track 12 and to the AND gate 68 for causing a resetting of the counter 64 to register a binary coded decimal count of 0 . . . 01. Since the output signal of the inverter 70 changed to a "0" condition at the occurrence of the index pulse, multivibrator 54 begins to provide the square wave output signal having a decreased frequency, the signal changing from a "1" to a "0" condition after a time interval equal to one-half cycle of the newly established frequency.

The above described chain of events is repeated during the next drum revolution except that a smaller change in the voltage across the capacitor bank 50 is caused by the decrement driver 42 because the duration of the output signal in a "1" condition from AND gate 38 is shorter. Consequently, the frequency of the multivibrator square wave is further decreased a change which is smaller than that experienced after the first discussed drum revolution. The above sequence of operations continues until the clock pulse from generator 80 occurs coincidentally with the index clock pulse, at which time closure shall have been achieved and the appropriate number of equally spaced clock pulses shall have been recorded upon the clock track 12.

Referring now to the waveforms of FIG. 3, it has been assumed that the frequency of the multivibartor output is too low relative to the speed of rotation of the drum 10. At the time when an index clock pulse occurs, the multivibrator 54 is continuing to produce the square wave output since the top count signal provided by the decoder 66 has not changed to a "1" condition. The index clock pulse resets flip-flop 34, flip-flop 36 having been previously reset by the "1" signal pulse from the decoder 82. Consequently, the reset output signals of the flip-flops 36 and 34, which are the complements of the waveforms L and M of FIG. 3, cause the AND gate 40 to actuate the increment driver 46 to cause the voltage across the capacitor bank 50 to be increased. The increasing voltage causes the frequency of the output of the multivibrator 54 to be continually increased as is shown by the progressively decreasing periods of the multivibrator output, waveform C, after the occurrence of the index clock pulse.

When the decoder 72 provides an output signal having a "1" condition and when the next full clock pulse occurs, the AND gate 74 provides a signal which triggers single-shot multivibrator 78 which, in turn, provides the rectangular signal, waveform I. The above-mentioned full clock pulse also causes the counter 64 to register the predetermined count which, in turn, causes the decoder 66 to provide the top count signal in a "1" condition to the AND gate 56. Consequently, the output of the multivibrator 54 is held in a "1" condition until the next occurring index clock pulse.

The rectangular signal from multivibrator 78 causes the generator 80 to provide the clock pulse, waveform K, after a time interval equal to one cycle of the corrected frequency of the square wave. The clock pulse from generator 80 sets the flip-flop 36. Therefore, the signal appearing at the reset output terminal of the flip-flop 36, which is the complement of waveform L, has gone to a "0" condition; and the driver 46 ceases to cause a further increase in the voltage across the capacitor bank 50. At some time later, the decoder 82 provides a pulse to reset the flip-flop 36 and to set the flip-flop 34.

When the head 20s reads the next occurring index pulse and the inverter output signal assumes a "0" condition; and the multivibrator 54 is released by the AND gate 56 and begins to provide a square wave output signal having the adjusted, higher frequency. Also, the counter 64 is reset to a binary coded decimal count of 0 . . . 01, and the write circuits 28 are activated by the index clock pulse to cause a clock pulse to be written on the track 12. If top count has not been achieved, another incremental correction to further increase the frequency of the output of the multivibrator 54 will occur as described above. The frequency correction process will continue until coincidence is achieved between the index clock pulse and the clock pulse from the generator 80 and the AND gate 86 so signals the control unit 24.

Referring now to FIG. 4, it can be seen from the waveforms A–M, inclusive, that when coincidence is achieved, full clock pulses are generated both a cycle after the occurrence of an index pulse and a cycle before thhe occurrence of the next succeeding index pulse. Similarly, the half clock pulses are generated and spaced in time so that one is provided one-half cycle after the occurrence of an index clock pulse, as caused by the output signal of the multivibrator 54. The last half clock pulse of the series during one drum revolution is provided one half-cycle before the occurrence of the next succeeding index clock pulse, as caused by the output signal of the multivibrator 84.

The index clock pulse and the clock pulse from generator 80 are provided simultaneously and respectively are used to set the flip-flop 34 and to reset the flip-flop 36 at the same time as is indicated by the waveforms L and M. Consequently, neither of the AND gates 38 and 40 will provide their respective drivers 42 and 46 with signals in "1" conditions to cause incremental changes in the frequency of the square wave output signal of the multivibrator 54.

Since the index clock pulse is fed to the write circuits 28, a clock pulse is recorded on the track 12 at the time of the occurrence of the index pulse so that the track 12 has recorded thereon a full series of full clock pulses and a full series of half clock pulses, each of which pulses are properly spaced in time from the others. The production of the waveforms of FIG. 4 will continue until the control unit 24 causes the cessation of the clock track recording mode of operation of apparatus in response to the pulses received from the AND gate 86.

The above-described clock track recording apparatus digitally ascertains the degree and direction of the relative difference in the location of the index pulse prerecorded on the spare track 14 of the revolving drum 10 and the time location of the last clock pulse in the series which should be recorded on the clock track of the magnetic drum 10 and accordingly causes a corresponding change in the multivibrator output frequency which is used to actuate the writing of clock pulses on the clock track 12. Thereby, apparatus is provided which can affect a more exact closure in a shorter time than heretofore known. While the above apparatus has been described as being one which records both full clock pulses and half clock pulses on the clock track 12, the writing circuits 28 can easily be adapted for providing a series of clock pulses having twice the frequency of the described series of full clock pulses in response to the full clock pulses received from generator 58, the half clock pulses received from generator 60, and the index clock pulse received from generator 32.

It should be understood, of course, that the foregoing disclosure relates only to the preferred embodiment of the invention and that numerous modifications or alterations may be made without departing from the spirit and scope of the invention as set forth in the appended claims.

What is claimed is:

1. Apparatus for recording equally time-spaced pulses on a revolving drum comprising:
- index pulse means for indicating the occurrence of a complete revolution of the drum;
- frequency variable pulse means providing clock pulses;
- counter means coupled to said variable pulse means for providing a signal pulse after counting a predetermined number of said clock pulses;
- digital correction signal means coupled to said variable pulse means for varying the frequency of said clock pulses, said correction signal having a high and a low state;
- correction control means including first digital logic means receiving said signal pulse and said index pulse for providing an output indicating which of said received pulses leads the other and second digital logic means receiving the output of said first digital logic means and producing the high state of said correction signal during the interval between said index and said signal pulse and producing the low state outside of said interval; and
- recorder means connected to said variable pulse means for receiving said clock pulses and recording a series of correspondingly timed clock pulses on said drum.

2. Apparatus for recording equally time-spaced clock pulses on a clock track of a revolving drum, said apparatus comprising: index means adapted for an index clock pulse in response to the occurrence of a complete revolution of the drum;
- pulse means for providing a series of clock pulses including:
- voltage controlled means for providing a periodically varying electrical signal having a frequency established by the level of a control voltage received thereby;
- clock generator means connected to said voltage control means for receiving said periodically varying electrical signal, said generator means providing said series of clock pulses;
- capacitor means;
- driver means receiving said frequency increase signal and said frequency decrease signal for correspondingly increasing and decreasing the level of a voltage across said capacitor means in response to the respective durations of said frequency increase and frequency decrease signals; and
- means connected to said capacitor means and connected to said voltage controlled means for providing thereto said control voltage which varies in accordance with the voltage level across said capacitor means;
- means connected to said pulse means for receiving said series of clock pulse, said means providing a signal clock pulse one cycle after said series of said pulses has been provided thereto;
- logic means connected to said index means for receiving said index clock pulse, connected to receive said signal clock pulse adapted for providing said frequency increase signal having a duration related to the time differential between said index clock pulse a later occurring said signal clock pulse and adapted for providing said frequency decrease signal having a duration related to the time differential between said signal clock pulse and a later occurring said index clock pulse;
- said pulse means being connected to said logic means for receiving said frequency increase and frequency decrease signals; and
- means connected to said pulse means for receiving said series of clock pulses and adapted for recording a series of correspondingly timed clock pulses on the clock track of the revolving drum.

3. Apparatus for recording equally time-spaced clock pulses on a clock track of a revolving drum, said apparatus comprising:
- index means adapted for providing an index pulse in response to the occurrence of a complete revolution of the drum;
- pulse means for providing a series of clock pulses and adapted for increasing and decreasing the frequency of said pulses in said series by controlled amounts in response to respective durations of frequency increase and frequency decrease signals provided thereto;
- means connected to said pulse means to receive said series of clock pulses for providing a signal clock pulse including:
- counter means connected to said pulse means for receiving said series of clock pulses and for providing an output signal indicative of the number of pulses received thereby;
- decoder means connected to said counter means to receive said output signal thereof for providing an output signal when said counter means has counted one less than the number of said clock pulses in said series;
- AND gate means connected to said pulse means for receiving said series of clock pulses and connected to said decoder means for receiving said output signal thereof and for providing an output signal; and means connected to said AND gate means for receiving said output signal thereof for providing said signal clock pulse one cycle after receiving said AND gate signal;

logic means connected to said index means for receiving said index clock pulse, connected to receive said signal clock pulse adapted for providing said frequency increase signal having a duration related to the time differential between said index clock pulse and a later occurring said signal clock pulse and adapted for providing said frequency decrease signal having a duration related to the time differential between said signal clock pulse and a later occurring said index clock pulse;

said pulse means being connected to said logic means for receiving said frequency increase and frequency decrease signals; and means connected to said pulse means for receiving said series of clock pulses and adapted for recording a series of correspondingly timed clock pulses on the clock track of the revolving drum.

4. Apparatus according to claim 3 further including:

another decoder means connected to said counter means for receiving said output signal thereof and for providing an output signal when said counter has counted the number of said clock pulses in said series;

means connected to said other decoder for receiving said output signal thereof, connected to said index means and connected to said pulse means for inhibiting said pulse means and causing it to fail to provide said clock pulses when said output signal is being provided by said second decoder means and for enabling said pulse means to provide said pulses when said index means thereafter provides an index clock pulse; and another AND gate means connected to receive said index clock pulse and connected to said other decoder means to receive said output signal thereof for providing a reset signal to said counter means;

said counter means being connected to receive said other AND gate output signal and being responsive thereto for resetting itself to provide an output indicative of an initial predetermined count.

5. Apparatus according to claim 3 wherein:

said means adapted for recording pulses is connected to said index means for receiving said index clock pulse and for recording a correspondingly timed clock pulse on the clock track of the revolving drum.

6. Apparatus for recording equally time-spaced clock pulses on a clock track of a revolving drum, said apparatus comprising:

index means adapted for providing an index clock pulse in response to the occurrence of a complete revolution of the drum;

pulse means for providing a series of clock pulses and adapted for increasing and decreasing the frequency of said pulses in said series by controlled amounts in response to respective durations of frequency increase and frequency decrease signals provided thereto;

means connected to said pulse means for receiving said series of clock pulses, said means providing a signal clock pulse one cycle after said series of said pulses has been provided thereto;

first flip-flop means connected to said index means for receiving said index clock pulse and for providing a flip-flop output signal;

second flip-flop means connected to said signal clock means for receiving said signal clock pulse and for providing a flip-flop output signal;

first logic means connected to receive an output signal from each of said first and second flip-flop means for providing said frequency increase signal; and second logic means connected to receive an output signal from each of said first and second flip-flop means for providing said frequency decrease signal;

said pulse means being connected to said first and second logic means for receiving said frequency increase and frequency decrease signals; and means connected to said pulse means for receiving said series of clock pulses and adapted for recording a series of correspondingly timed clock pulses on the clock track of the revolving drum.

7. Apparatus according to claim 6 further including:

AND gate means connected to receive an output signal from each of said first and second flip-flop means, connected to receive said signal clock pulse and connected to said index means for receiving said index clock pulse, said AND gate means providing an output signal in response to coincidence in the occurrences of said signal clock pulse and said index clock puse.

8. Apparatus according to claim 6 wherein said pulse means includes:

voltage controlled means for providing a periodically varying electrical signal having a frequency established by the level of a control voltage received thereby;

clock generator means connected to said voltage controlled means for receiving said periodically varying electrical signal, said generator means providing said series of clock pulses;

capacitor means;

driver means connected to said first and second logic means for receiving said frequency increase signal and said frequency decrease signal for correspondingly increasing and decreasing the level of a volutage across said capacitor means in response to the respective durations of said frequency increase and frequency decrease signals; and amplifier means connected to said capacitor means and connected to said voltage controlled means for providing thereto said control voltage which varies in accordance with the voltage level across said capacitor means.

9. Apparatus according to claim 8 wherein said means providing said signal clock pulse includes:

counter means connected to said pulse means for receiving said series of clock pulses and for providing an output signal indicative of the number of pulses received thereby;

decoder means connected to said counter means to receive said output signal thereof for providing an output signal when said counter means has counted one less than the number of said clock pulses in said series;

AND gate means connected to said generator means for receiving said series of clock pulses and connected to said decoder means for receiving said output signal thereof for providing an output signal;

multivibrator means connected to said AND gate means for receiving said output signal thereof and connected to said amplifier means for receiving said control voltage, said multivibrator means providing an output pulse of duration controlled by said control voltage in response to said AND gate signal; and another clock generator means connected to said multivibrator means for receiving said output pulse therefrom, said other generator means providing a said signal clock pulse in response to the trailing edge of said output pulse.

10. Apparatus according to claim 9 further including:

another decoder means connected to said counter means for receiving said output signal thereof and for providing an output signal when said counter has counted the number of said clock pulses in said series;

means connected to said other decoder for receiving said output signal thereof, connected to said index means and connected to said pulse means for inhibiting said pulse means and causing it to fail to provide said clock pulses when said output signal is being provided by said other decoder means and for enabling said pulse means to provide said pulses when said index means thereafter provides an index clock pulse; and another AND gate means connected to receive said index clock pulse and connected to said other decoder means to receive said output signal thereof for providing a reset signal to said counter means;

said counter means being connected to receive said other AND gate output signal and being responsive thereto for resetting itself to provide an output signal indicative of an initial predetermined count.

11. Apparatus according to claim 9 wherein:

said voltage controlled means provides a square wave; and said clock generator means is responsive to the leading edges of the pulses in said square wave for providing a series of full clock pulses coincidentally timed therewith; said apparatus further including:

additional clock generator means connected to said voltage controlled means for receiving said square wave, said additional generator means being responsive to the trailing edges of said pulses in said square wave for providing a series of half clock pulses coincidentally timed therewith;

additional AND gate means connected to said additional generator means for receiving said series of half clock pulses and connected to said decoder means for receiving said output signal thereof for providing an output signal; and additional multivibrator means connected to said additional AND gate means for receiving said output signal thereof and connected to said amplifier means for receiving said control voltage, said additional multivibrator means providing an output pulse of duration controlled by said control voltage in response to said additional AND gate signal;

said additional generator means being connected to said additional multivibrator means for receiving said pulse thereof and providing a half clock pulse in response to the trailing edge of said additional multivibrator output pulse; and said means adapted for recording pulses being connected to said index means for receiving said index clock pulse and being connected to said additional generator means for receiving said half clock pulses for recording correspondingly timed clock pulses on the clock track of the revolving drum.

12. Apparatus according to claim 11 further including:

further AND gate means connected to said first and second flip-flop means for receiving an output signal from each, connected to said other clock generator means for receiving said signal clock pulse and connected to said index means for receiving said index clock pulse, said further AND gate means providing an output signal in response to coincidence in the occurrences of said signal clock pulse and said index clock pulse.

13. Apparatus according to claim 12 further including:

additional decoder means connected to said counter means for receiving said output signal thereof and for providing an output pulse before the first said decoder means provides its respective said output signal;

said first flip-flop means being connected to said additional decoder means for receiving said output pulse thereof, said first flip-flop means providing a reset output signal in response to receiving said index clock pulse and a set output signal in response to receiving said decoder output pulse;

said second flip-flop means being connected to said additional decoder means for receiving said output pulse thereof, said second flip-flop means providing a set output signal in response to receiving said signal clock pulse and a reset output signal in response to receiving said decoder output pulse;

said first means being connected to said first and second flip-flops for receiving said reset output signals thereof and providing said frequency increase signal when both said signals are being received thereby;

said second means being connected to said first and second flip-flops for receiving said set output signals thereof and providing said frequency decrease signal when both signals are being received thereby; and said further AND gate means being connected to said first flip-flop means for receiving said set output signal thereof and being connected to said second flip-flop means for receiving said reset output signal thereof.

14. Apparatus according to claim 13 further including:

another decoder means connected to said counter means for receiving said output signal thereof and for providing an output signal when said counter has counted the number of said clock pulses in said series;

means connected to said other decoder for receiving said output signal thereof, connected to said index means and connected to said pulse means for inhibiting said pulse means and causing it to fail to provide said clock pulses when said output signal is being provided by said other decoder means and for enabling said pulse means to provide said pulses when said index means thereafter provides an index clock pulse; and another AND gate means connected to receive said index clock pulse and connected to said other decoder means to receive said output signal thereof for providing a reset signal to said counter means;

said counter means being connected to receive said other AND gate output signal and being responsive thereto for resetting itself to provide an output signal indicative of an initial predetermined count.

References Cited

UNITED STATES PATENTS

| | | | |
|---|---|---|---|
| 2,903,677 | 9/1959 | Curtis | 340—174.1 |
| 2,926,341 | 2/1960 | Scarbrough | 340—174.1 |

BERNARD KONICK, Primary Examiner

W. F. WHITE, Assistant Examiner

UNITED STATES PATENT OFFICE
CERTIFICATE OF CORRECTION

Patent No. 3,531,787 Dated September 29, 1970

Inventor(s) Horace T. Fuller

It is certified that error appears in the above-identified patent and that said Letters Patent are hereby corrected as shown below:

Column 10, line 4, after the colon start a new paragraph, and after "for" insert -- providing --; lines 13 and 14, "control" should read -- controlled --; line 30, "pulse" should read -- pulses --; line 37, after "pulse" insert -- and --; line 53, before "pulse" insert -- clock --. Column 12, line 19, "puse" should read -- pulse --; line 34, "volutage" should read -- voltage --.

Signed and sealed this 30th day of March 1971.

(SEAL)
Attest:

EDWARD M.FLETCHER,JR.
Attesting Officer

WILLIAM E. SCHUYLER, JR.
Commissioner of Patents

FORM PO-1050 (10-69)

USCOMM-DC 60376-P69
☆ U.S. GOVERNMENT PRINTING OFFICE : 1969 O—366-334